C. W. BENJAMIN.
ROLLING MILL.
APPLICATION FILED JULY 5, 1918.
1,330,423.
Patented Feb. 10, 1920.
2 SHEETS—SHEET 1.
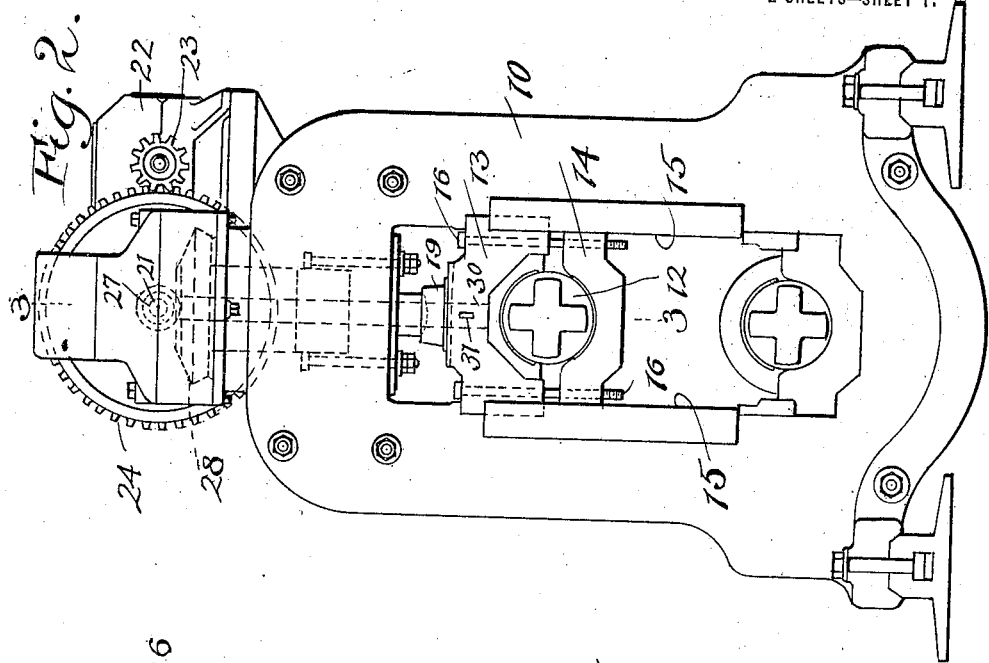
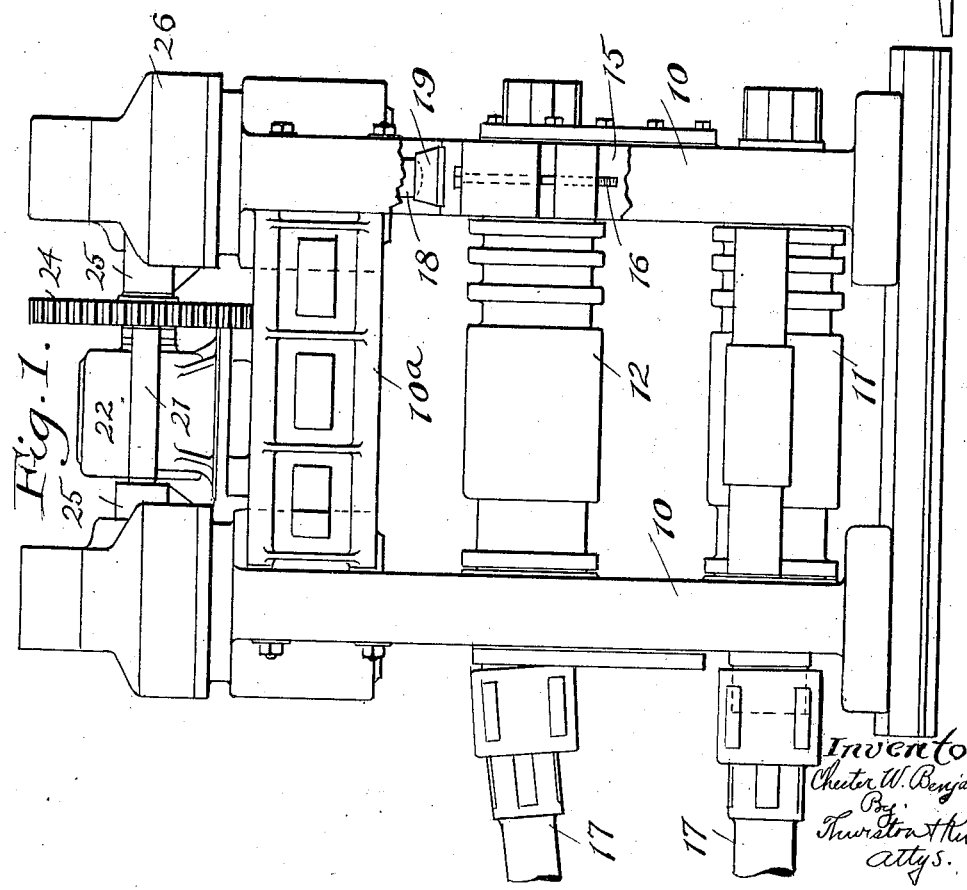

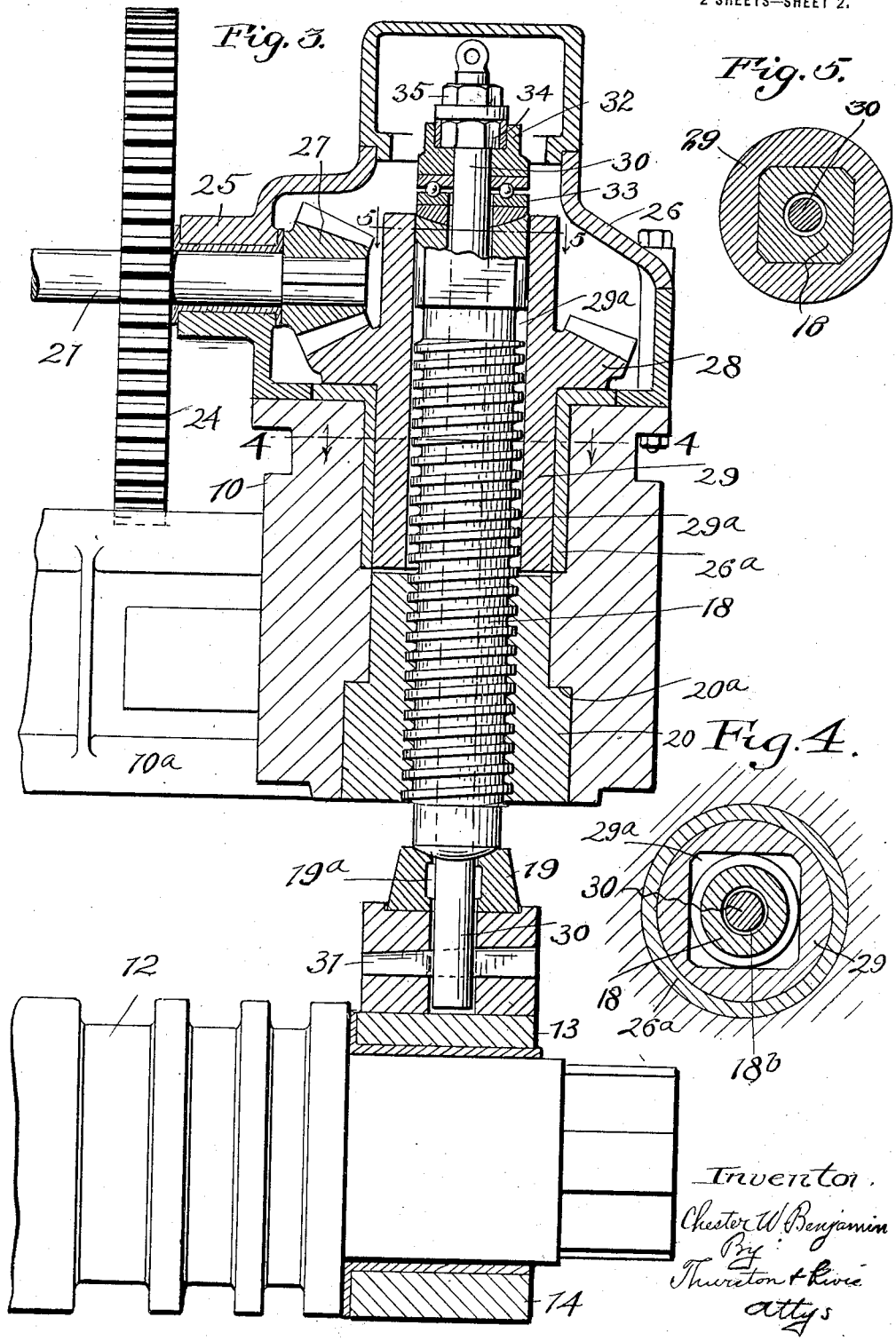

UNITED STATES PATENT OFFICE.

CHESTER W. BENJAMIN, OF LAKEWOOD, OHIO, ASSIGNOR TO THE WELLMAN-SEAVER-MORGAN COMPANY, OF CLEVELAND, OHIO, A CORPORATION OF OHIO.

ROLLING-MILL.

1,330,423.  Specification of Letters Patent.  Patented Feb. 10, 1920.

Application filed July 5, 1918. Serial No. 243,252.

*To all whom it may concern:*

Be it known that I, CHESTER W. BENJAMIN, a citizen of the United States, residing at Lakewood, in the county of Cuyahoga and State of Ohio, have invented a certain new and useful Improvement in Rolling-Mills, of which the following is a full, clear, and exact description.

This invention relates to rolling mills, and has particular reference to mechanism for shifting the upper roll to vary the space between a pair of rolls between which a bar, billet or bloom is rolled.

The mechanism to which my invention pertains is commonly known as top roll screw down and balancing mechanism, the function of which is to lower the top roll and resist the upward pressure during the rolling operation, and also to suspend or support the top roll and to elevate it when the distance between the rolls is to be increased.

The mechanism ordinarily employed for this purpose includes for each end of the top roll an adjustable motor driven screw for the purpose of resisting the upward thrust on the corresponding bearing block or chuck, and also to lower the bearings and roll, and a hydraulic plunger or piston which is above the screw and is connected by a pair of rods extending downward on opposite sides of the screw to the bearing chucks to elevate the roll, and to support it between the rolling operations. That is to say, separate motors, usually electric and hydraulic, and separate and independent devices are generally utilized for the screw down and balancing functions. This rather complicated and not entirely satisfactory mechanism or sets of mechanisms have been utilized due largely to the fact that it is desired that the enormous upward thrust on the upper roll be transmitted to the bearing housings through socalled breaker blocks, which were interposed between the bearing chucks and the lower ends of the motor actuated screws, and for the further reason that it is desired that the balancing mechanism be relieved of this thrust and in fact of any load except the weight of the roll and its bearings.

The principal object of the present invention is to simplify the construction heretofore commonly employed, and to reduce the head room of said mechanism. More particularly it is the aim of the invention to eliminate the hydraulic pistons and cylinders which are employed in the balancing mechanism, and to provide a simple, compact, yet durable and efficient mechanism by which both the lowering of the roll or the screw down operation and the elevating of the roll or the balancing operation may be accomplished through the same motor.

The invention may be briefly summarized as consisting in certain novel details of construction and combinations and arrangements of parts which will be described in the specification and set forth in the appended claims.

In the accompanying sheets of drawings, wherein I have shown one embodiment of my invention which operates with high efficiency, Figure 1 is a front view of a mill embodying my invention in its preferred form, a part of one of the housings being broken away; Fig. 2 is a side view of the same; Fig. 3 is an enlarged sectional view showing the screw-down and balancing mechanism, the section being taken through the upper part of one of the housings substantially along the line 3—3 of Fig. 2, and showing a portion of the upper roll in elevation; Fig. 4 is a transverse sectional view substantially along the line 4—4 of Fig. 3, and Fig. 5 is a sectional view substantially along the line 5—5 of Fig. 3.

In the drawings, 10—10 represent the roll housings which may be of usual construction and accommodate the lower roll 11 mounted for rotary movement only, and an upper roll 12, adapted to be adjusted vertically to vary the space or distance between the rolling surfaces. The roll 12 is supported in bearing blocks or so-called chucks 13 and 14 adjustable vertically in parallel vertical guideways 15 in the upright portions of the housings 10. In this instance, the chucks 13 and 14 are held together by bolts 16, since the balancing rods are attached to the upper chucks as will subsequently appear. The rolls 11 and 12 are preferably driven by the ordinary spindles 17, having universal connections with the ends of the rolls. The parts so far described are in the main of standard construction.

The screw-down and balancing mechanism of the upper roll having for its principal feature the elimination of the customary hydraulic cylinders and plungers, and the successful actuation of both parts, or the performance of both functions through a single or unitary source of power, may be embodied in different forms, but in the drawings I have shown only the preferred embodiments which will now be explained.

The resistance of the upward thrust on the upper roll, and the transference of the thrust to the housings, and the lowering of the roll are accomplished through vertically disposed adjustable screws or threaded shafts 18 mounted centrally in the top portion of each housing directly above the axis of the upper roll 12. There is no direct connection between these screws and the chucks of the upper roll, but the lower end of each screw is rounded and engages in a concave recess at the top of the breaker block 19, seated in a suitably recessed part at the top of the corresponding upper chuck 13. It will be understood that these breaker blocks 19 are commonly employed between the vertical screws and the upper chucks of the roll to protect the screw-down mechanism against breakage should the thrust on the upper roll become excessive or more than a predetermined amount, these breaker blocks being generally formed of cast iron and being designed to break before any breakage of the screw-down mechanism *per se* can occur.

Each screw 18 has a threaded or screw connection with a bushing or threaded sleeve 20 which is tightly driven or otherwise suitably held in the lower part of the opening in the upper part of the housing through which the screw-down mechanism extends. As is customary, this bushing 20 has a shoulder 20ª engaging a suitably shouldered part of the housing for the transmission of the heavy upward thrust to the housing, it being understood that the thrust is transmitted from the screw to the bushing through the engaging threads which are made suitably heavy for that purpose.

The screw is rotated in the stationary bushing 20, and hence lowered or raised to lower the roll or to permit the balancing part of the mechanism to elevate the roll by a shaft 21 which extends across the top of the mill. This shaft may be driven by any suitable source of power, but it is preferably electrically driven either by one electric motor, or if desired, by two relatively small motors. In the drawings a single electric motor 22 is shown, this motor being mounted at the top of the mill on the spacers 10ª connecting the two housings, and being provided with a pinion 23 which engages the relatively large gear 24 secured to the shaft 21. This shaft extends through, and is journaled in bearing bosses 25 of two gear casings 26, one mounted at the top of each housing and inclosing actuating bevel gearing, and the upper portions of the screws 18. At its extreme ends this shaft is provided with bevel gears 27, one of which is shown in Fig. 3. Each gear drives a bevel gear 28 arranged in the corresponding casing 26 and supported co-axially with respect to one of the roll adjusting and thrust resisting screws 18. Any other suitable type of gearing than bevel gearing may of course be employed. Each bevel gear 28 has formed integral with it a vertical sleeve 29 with a square or other non-circular opening 29ª extending through it, the lower part of the sleeve extending down for a distance along the threaded portion of the screw and journaled in a bushing 26ª at the top of the housing.

The upper part of the screw or threaded shaft 18 is squared as shown in Fig. 5 or otherwise shaped to correspond to the shape of the opening 29ª of the sleeve 29, and this portion of the shaft has a sliding fit with the sleeve so that when the bevel gear 28 and sleeve 29 are rotated, the sleeve is of necessity rotated and will move up and down relative to the sleeve 29 by reason of the threaded engagement with the fixed bushing 20. Thus by the rotation of the screw in one direction, and its consequent lowering, the roll may be lowered, and when the screw is stationary the upward thrust on the roll is transmitted through the breaker blocks, through the screws and threaded bushings to the housings, so that the mechanism so far described answers all the requirements of a successful screw-down mechanism.

The roll balancing is accomplished through the motor driven shaft 21 and gears 27 and 28 forming a part of the screw-down mechanism, together with parts which in this instance are co-axial with the screws and are caused to function through the raising and lowering of the latter. In the embodiment of my invention here shown, these co-axial parts consist of two rods 30, each of which extends centrally through one of the screws 18 which is made hollow or provided with an opening 18ᵇ extending from end to end. Likewise the rod extends through a central opening 19ª of the associated breaker block as clearly shown in Fig. 3. Furthermore, the lower ends of the two rods 30 have roll-supporting connections with the upper chucks or bearing blocks 13 for the upper rolls, and in this case the lower end of each rod extends into an opening in the top of the chuck 13 and is fastened therein by a transverse pin 31 passing through alined openings in the pin and chuck, and the upper end of each rod has a supporting connection with the upper part of the associated screw, and in this case this is accomplished by providing at the upper end of the rod a head 32, and between the head and the upper end of the screw a step ball bearing 33 or other suitable form of bearing.

In this instance the head consists of a block in the form of a disk recessed at the top to receive a nut 34 screwed onto the end of the rod and held from turning in the recess, together with a lock nut 35 on top of the nut 34.

With this construction the balancing parts of the mechanism are relieved of the upward thrust of the roll since this upward thrust has no tendency other than to possibly slightly lift the rods 30, but the rods sustain or support the roll, the load of the roll being then transmitted through the rods to the upper ends of the screws and from the latter to the threaded bushings, and finally to the housings, and during the screw-down operation the rods are free to follow the screws as the latter are lowered. In consequence all the necessary functions of the top roll balancer are successfully performed.

It is obvious that certain changes may be made in the construction shown without affecting the principle of the invention.

Having described my invention, I claim:—

1. In combination with a rolling mill comprising a pair of housings, a pair of rolls one movable toward and from the other and having bearing blocks guided in the housings, hollow screws rotatably mounted in the housings for transmitting thrust from the adjustable roll to the housings, and means for supporting said second roll extending through said screws.

2. In combination with a rolling mill comprising a pair of housings, a lower roll and a second roll movable toward and from the first-named roll and having bearing blocks guided in the housings, hollow screws rotatably mounted in the housings for transmitting thrust from the adjustable roll to the housings, and means for elevating and supporting the second roll comprising rods extending centrally through the screws, said rods being supported by said screws and at the lower ends having a connection with the bearing blocks.

3. In combination with a rolling mill comprising a pair of housings, a lower roll and a vertically adjustable upper roll having bearing blocks guided in the housings, a pair of hollow screws rotatably supported in the housings and adapted to transmit thrust during rolling from the upper roll to the housings, means surrounding said screws for rotating the same, and means for supporting and elevating the upper roll comprising rods extending through the hollow screws, each of said rods having a step bearing on the upper end of the associated screw and at its lower end being connected to the corresponding bearing block.

4. In a rolling mill construction, a pair of housings, a pair of rolls one movable toward and from the other and having bearing blocks guided in the housings, hollow screws rotatably mounted in the housings for transmitting thrust from the movable roll to the housings, breaker blocks between the screws and the bearing blocks of the movable roll, and balancing rods extending through the screws and breaker blocks and connected to said bearing blocks.

5. In a rolling mill construction, a pair of housings, a lower stationary roll, an upper vertically movable roll having bearing blocks guided in the housings, a pair of hollow screws rotatably supported in the housings and adapted to transmit thrust during rolling from the upper roll to the housings, means for rotating the screws, breaker blocks between the screws and said bearing blocks, and balancing rods supported at the top of the screws and extending through the latter and through the breaker blocks to said bearing blocks to which they are suitably connected.

In testimony whereof I hereunto affix my signature.

CHESTER W. BENJAMIN.